United States Patent
Syed Muhammad et al.

(10) Patent No.: US 12,452,142 B2
(45) Date of Patent: Oct. 21, 2025

(54) METHOD OF DATA EXCHANGE FOR MAINTENANCE OF ARTIFICIAL INTELLIGENCE OR MACHINE LEARNING MODELS IN WIRELESS COMMUNICATION

(71) Applicant: Nokia Technologies Oy, Espoo (FI)

(72) Inventors: Fahad Syed Muhammad, Massy (FR); Sakira Hassan, Espoo (FI); Dimitri Gold, Espoo (FI); István Zsolt Kovács, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 14 days.

(21) Appl. No.: 18/404,193

(22) Filed: Jan. 4, 2024

(65) Prior Publication Data
US 2024/0283709 A1    Aug. 22, 2024

(51) Int. Cl.
*H04L 41/16*    (2022.01)

(52) U.S. Cl.
CPC .................. *H04L 41/16* (2013.01)

(58) Field of Classification Search
CPC .... H04L 41/16; H04W 24/02; H04W 72/543; H04W 76/12; H04W 28/0252
See application file for complete search history.

(56) References Cited

U.S. PATENT DOCUMENTS

| | | | |
|---|---|---|---|
| 2018/0124855 A1* | 5/2018 | Kawasaki | ............. H04W 76/19 |
| 2019/0116531 A1 | 4/2019 | Ryu et al. | |
| 2021/0326701 A1 | 10/2021 | Bai et al. | |
| 2021/0328872 A1 | 10/2021 | Bongaarts et al. | |

(Continued)

FOREIGN PATENT DOCUMENTS

| | | | | |
|---|---|---|---|---|
| CN | 113873538 A | * | 12/2021 | |
| EP | 4072226 A1 | * | 10/2022 | ............. H04L 41/16 |
| EP | 4266750 A1 | * | 10/2023 | ........... H04B 17/318 |

(Continued)

OTHER PUBLICATIONS

"3rd Generation Partnership Project; Technical Specification Group Services and System Aspects; Policy and charging control architecture (Release 17)", 3GPP TS 23.203, V17.2.0, Dec. 2021, pp. 1-270.

(Continued)

*Primary Examiner* — Philip C Lee
(74) *Attorney, Agent, or Firm* — Lippes Mathias LLP

(57) ABSTRACT

In accordance with example embodiments of the invention there is at least a method an apparatus to perform receiving or sending, between a network node of a communication network, and a user equipment information comprising a service request for a dedicated bearer for data exchange of at least one of machine learning or artificial intelligence related data, wherein the data exchange is for training at least one of a machine learning or an artificial intelligence model for a particular use case; communicating the information with the communication network; handling control over at least one of an artificial intelligence or machine learning related data exchange through a machine learning-dedicated bearer, wherein the artificial intelligence or machine learning related data exchange comprises: data collection, model transfer, and life cycle Management for at least one of a machine learning model or machine learning functionality control signalling.

11 Claims, 6 Drawing Sheets

---

530: sending by a user equipment of a communication network, towards a network node information comprising a service request for a dedicated bearer for data exchange of at least one of machine learning or artificial intelligence related data

↓

535: wherein the data exchange is for training at least one of machine learning or an artificial intelligence model for a particular use case

↓

540: based on the information, receiving from the network node an indication of a configured dedicated bearer

↓

545: wherein the dedicated bearer is configured using predefined settings for a particular quality of service class identifier

↓

550: based on the indication, performing uplink data communication on the dedicated bearer for the training

(56) References Cited

U.S. PATENT DOCUMENTS

| | | | |
|---|---|---|---|
| 2022/0104055 A1 | 3/2022 | Wahaj Arshad et al. | |
| 2022/0417799 A1 | 12/2022 | Schnitzler et al. | |

FOREIGN PATENT DOCUMENTS

| | | | | |
|---|---|---|---|---|
| WO | WO-2022028664 A1 | * | 2/2022 | ............. G06N 20/00 |
| WO | 2022/090809 A1 | | 5/2022 | |
| WO | 2022/133865 A1 | | 6/2022 | |
| WO | WO-2022235525 A1 | * | 11/2022 | ............. G06N 20/00 |

OTHER PUBLICATIONS

"3rd Generation Partnership Project; Technical Specification Group Services and System Aspects; System architecture for the 5G System (5GS), Stage 2 (Release 18)", 3GPP TS 23.501, V18.0.0, Dec. 2022, pp. 1-593.

"Summary#1 of General Aspects of AI/ML Framework", 3GPP TSG RAN WG1 Meeting #111, R1-22xxxxx, Agenda: 9.2.1, Qualcomm, Nov. 14-18, 2022, pp. 1-153.

"New SI: Study on Artificial Intelligence (AI)/Machine Learning (ML) for NR Air Interface", 3GPP TSG RAN Meeting #94e, RP-213599, Agenda: 8.6.1, Qualcomm, Dec. 6-17, 2021, 6 pages.

"Discussion on AI/ML methods", 3GPP TSG-RAN WG2 Meeting #120, R2-2212659, Agenda: 8.16.2 AIML Methods, Qualcomm Incorporated, Nov. 14-18, 2022, 13 pages.

"Summary of General Aspects of AI/ML Framework", 3GPP TSG RAN WG1 #109-e, R1-22xxxxx, Agenda: 9.2.1, Qualcomm, May 9-20, 2022, pp. 1-106.

Search Report received for corresponding United Kingdom Patent Application No. 2302193.4, dated Aug. 15, 2023, 3 pages.

Extended European Search Report received for corresponding European Patent Application No. 24150626.0, dated Jun. 10, 2024, 10 pages.

* cited by examiner

| QCI # | Resource Type # | Priority # | Packet Delay Budget # | Packet Error Loss Rate # | Example Services | * |
|---|---|---|---|---|---|---|
| 1 | GBR | 2 | 100ms | $10^{-2}$ | Conversational Voice | |
| 2 | GBR | 4 | 150ms | $10^{-3}$ | Conversational Video (Live Streaming) | |
| 3 | GBR | 3 | 50ms | $10^{-3}$ | Real Time Gaming, V2X messages | |
| 4 | GBR | 5 | 300ms | $10^{-6}$ | Non-Conversational Video (Buffered Streaming) | |
| 65 | GBR | 0.7 | 75ms | $10^{-2}$ | Mission Critical user plane Push To Talk voice (e.g., MCPTT) | |
| 66 | GBR | 2 | 100ms | $10^{-2}$ | Non-Mission-Critical user plane Push To Talk voice | |
| 67 | GBR | 1.5 | 100ms | $10^{-3}$ | Mission Critical Video user plane | |
| 75 | GBR | 2.5 | 50ms | $10^{-2}$ | RMS Signaling | |
| 5 | non-GBR | 1 | 100ms | $10^{-6}$ | IMS Signaling | |
| 6 | non-GBR | 6 | 300ms | $10^{-6}$ | Video (Buffered Streaming) TCP-Based (for example, www, email, chat, ftp, p2p and the like) | |
| 7 | non-GBR | 7 | 100ms | $10^{-3}$ | Voice, Video (Live Streaming), Interactive Gaming | |
| 8 | non-GBR | 8 | 300ms | $10^{-6}$ | Video (Buffered Streaming) TCP-Based (for example, www, email, chat, ftp, p2p and the like) | |
| 9 | non-GBR | 9 | 300ms | $10^{-6}$ | Video (Buffered Streaming) TCP-Based (for example, www, email, chat, ftp, p2p and the like) Typically used as default carrier | |
| 69 | non-GBR | 0.5 | 60ms | $10^{-6}$ | Mission Critical delay sensitive signaling (e.g., MC-PTT signaling) | |
| 70 | non-GBR | 5.5 | 200ms | $10^{-6}$ | Mission Critical Data (e.g., example services are the same as QCI 6-8/9) | |
| 79 | non-GBR | 6.5 | 50ms | $10^{-2}$ | V2X messages | |
| 80 | non-GBR | 6.8 | 10ms | $10^{-6}$ | Low latency eMBB applications (TCP/UDP-based), Augmented Reality | |
| 82 | GBR | 1.9 | 10ms | $10^{-4}$ | Discrete Automation (small packets) | |
| 83 | GBR | 2.2 | 10ms | $10^{-4}$ | Discrete Automation (big packets) | |
| 84 | GBR | 2.4 | 30ms | $10^{-5}$ | Intelligent Transport Systems | |
| 85 | GBR | 2.1 | 5ms | $10^{-5}$ | Electricity Distribution - high voltage | |

FIG. 3

530: sending by a user equipment of a communication network, towards a network node information comprising a service request for a dedicated bearer for data exchange of at least one of machine learning or artificial intelligence related data 535: wherein the data exchange is for training at least one of machine learning or an artificial intelligence model for a particular use case 540: based on the information, receiving from the network node an indication of a configured dedicated bearer 545: wherein the dedicated bearer is configured using predefined settings for a particular quality of service class identifier 550: based on the indication, performing uplink data communication on the dedicated bearer for the training

FIG. 5B

555: receiving, by a device of a core network of a communication network, from a network node information comprising a service request from a user equipment for a dedicated bearer for data exchange of at least one of machine learning or artificial intelligence related data, wherein the data exchange is for training at least one of machine learning or an artificial intelligence model for a particular use case 560: sending towards the network node, a communication comprising an indication of a dedicated bearer for use by the user equipment for the data exchange 565: wherein the dedicated bearer is sent based on acceptance of the user equipment by the core network 570: wherein the dedicated bearer is configured using predefined settings for a particular quality of service class identifier

FIG. 5C

METHOD OF DATA EXCHANGE FOR MAINTENANCE OF ARTIFICIAL INTELLIGENCE OR MACHINE LEARNING MODELS IN WIRELESS COMMUNICATION

TECHNICAL FIELD

The teachings in accordance with the exemplary embodiments of this invention relate generally to control over machine learning or artificial intelligence related data and, more specifically, relate to a new machine learning-dedicated bearer for machine learning or artificial intelligence related data exchange related to model control and management.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:

| | |
|---|---|
| AI | Artificial Intelligence |
| CSI | Channel State Information |
| CSP | Communication Network Provider |
| GBR | Guaranteed Bit Rate |
| NAS | Non-Access Stratum |
| MLBR | Machine Learning Bearer |
| ML | Machine Learning |
| NR | New Radio, 5G |
| NW | Network |
| OCI | QoS Class Identifier |
| QoS | Quality of Service |
| RRC | Radio Resource Control |
| TFT | Traffic Flow Templates |
| UE | User Equipment |

With the emergence of Machine Learning (ML)-based use cases and features in wireless network, data collection or data exchange for Artificial Intelligence (AI)/ML applications in wireless network is getting increasing interest not only from Network infrastructure vendors and mobile operators but from User Equipment (UE) chipset vendors as well. This topic has been actively discussed in the recent standardization's meetings.

A standards based study item on AI/ML in New Radio (NR) air interface is ongoing currently at the time of this application in multiple 3GPP Radio Access Network (RAN) workgroups. In this SI, there are agreements to study use cases where AI/ML model may be hosted only in the UE side, such as sub-use cases of Channel State Information (CSI) or beam prediction.

In one standards meeting there was considered a new data collection framework for collecting required data for AI/ML offline training. It was evident from the discussion that UE chipset vendors prefer to have a user plane-based data collection framework in order to transfer training data towards dedicated servers for offline training, in a secure/undisclosed way. However, this approach doesn't suit to Telecom operators, who are against the transfer of unknown data towards an unknown server using their infrastructure, without any control on their side.

Example embodiments of the invention work to improve at least these type of Machine Learning (ML)-based use case features and data collection for Artificial Intelligence (AI)/ML applications in a network.

SUMMARY

This section contains examples of possible implementations and is not meant to be limiting.

In an example aspect of example embodiments of the invention, there is an apparatus, such as a network side apparatus, comprising: at least one processor; and at least one non-transitory memory storing instructions, that when executed by the at least one processor, cause the apparatus at least to: receive, by a network node of a communication network, from a user equipment information comprising a service request for a dedicated bearer for data exchange of at least one of machine learning or artificial intelligence related data, wherein the data exchange is for training at least one of a machine learning or an artificial intelligence model for a particular use case; communicate the information with the communication network; communicate the information with the communication network; handle control over at least one of an artificial intelligence or machine learning related data exchange through a machine learning-dedicated bearer, wherein the artificial intelligence or machine learning related data exchange comprises: data collection, model transfer, and life cycle Management for at least one of a machine learning model or machine learning functionality control signalling.

In still another example aspect of example embodiments of the invention, there is a method comprising: receiving, by a network node of a communication network, from a user equipment information comprising a service request for a dedicated bearer for data exchange of at least one of machine learning or artificial intelligence related data, wherein the data exchange is for training at least one of a machine learning or an artificial intelligence model for a particular use case; communicate the information with the communication network; handle control over at least one of an artificial intelligence or machine learning related data exchange through a machine learning-dedicated bearer, wherein the artificial intelligence or machine learning related data exchange comprises: data collection, model transfer, and life cycle Management for at least one of a machine learning model or machine learning functionality control signalling.

A further example embodiment is an apparatus and a method comprising the apparatus and the method of the previous paragraphs, wherein the at least one of machine learning or artificial intelligence related data is for at least one of full or partial model training, transfer of an offline trained model, model updates, or uplink or downlink model transfers for model life-cycle management of the at least one of a machine learning or an artificial intelligence model for the particular use case, wherein the model life-cycle management manages operations comprising at least one of activation, deactivation, switching, or updates for the at least one of a machine learning or an artificial intelligence model, wherein data life-cycle actions related to life cycle management are taken based on the machine learning related data or an artificial intelligence model for the particular use case, wherein the particular quality of service class identifier is based on at least one of a type of guaranteed bit rate or non-guaranteed bit rate bearer, a maximum bit rate allowed in uplink or downlink, a priority level, or a packet loss rate for the dedicated bearer, wherein communications with the communication network are each using a non-access stratum message encapsulated in a radio resource control message, wherein the information is received from the user equipment one of in response to a radio resource control connection complete message or in addition to a radio resource control connection complete message from the user equipment, wherein there is receiving from the user equipment, by the network node, an activated dedicated evolved packet system bearer context accept message; and communicate with the user equipment at least one of uplink or downlink data on the dedicated bearer, wherein the communicating is performed with a core network of the communication network, wherein the at least one of a machine learning or an artificial intelligence model is deployed as a new radio air interface mechanism or procedure, and/or wherein the request comprises an activate dedicated evolved packet system bearer context accept message.

A non-transitory computer-readable medium storing program code, the program code executed by at least one processor to perform at least the method as described in the paragraphs above.

In yet another example aspect of example embodiments of the invention, there is an apparatus comprising: means for receiving, by a network node of a communication network, from a user equipment information comprising a service request for a dedicated bearer for data exchange of at least one of machine learning or artificial intelligence related data, wherein the data exchange is for training at least one of a machine learning or an artificial intelligence model for a particular use case; means for communicating the information with the communication network; handle control over at least one of an artificial intelligence or machine learning related data exchange through a machine learning-dedicated bearer, wherein the artificial intelligence or machine learning related data exchange comprises: data collection, model transfer, and life cycle Management for at least one of a machine learning model or machine learning functionality control signalling.

In accordance with the example embodiments as described in the paragraph above, at least the means for receiving and sending comprises a network interface, and computer program code stored on a computer-readable medium and executed by at least one processor.

In an example aspect of example embodiments of the invention, there is an apparatus, such as a user equipment side apparatus, comprising: at least one processor; and at least one non-transitory memory storing instructions, that when executed by the at least one processor, cause the apparatus at least to: send, by a user equipment of a communication network, towards a network node information comprising a service request for a dedicated bearer for data exchange of at least one of machine learning or artificial intelligence related data, wherein the data exchange is for training at least one of a machine learning or an artificial intelligence model for a particular use case; and based on the information, receive from the network node an indication of a configured dedicated bearer, wherein the dedicated bearer is configured using predefined settings for a particular quality of service class identifier; and based on the indication, performing at least one of uplink or downlink data communication on the dedicated bearer for the training.

In still another example aspect of example embodiments of the invention, there is a method comprising: sending, by a user equipment of a communication network, towards a network node information comprising a service request for a dedicated bearer for data exchange of at least one of machine learning or artificial intelligence related data, wherein the data exchange is for training at least one of a machine learning or an artificial intelligence model for a particular use case; and based on the information, receiving from the network node an indication of a configured dedicated bearer, wherein the dedicated bearer is configured using predefined settings for a particular quality of service class identifier; and based on the indication, performing at least one of uplink or downlink data communication on the dedicated bearer for the training.

A further example embodiment is an apparatus and a method comprising the apparatus and the method of the previous paragraphs, wherein the at least one of machine learning or artificial intelligence related data is for at least one of full or partial model training, transfer of an offline trained model, model updates, or uplink or downlink model transfers for model life-cycle management of the at least one of a machine learning or an artificial intelligence model for the particular use case, wherein the model life-cycle management manages operations comprising at least one of activation, deactivation, switching, or updates for the at least one of a machine learning or an artificial intelligence model, wherein data life-cycle actions related to life cycle management are taken based on the machine learning related data or an artificial intelligence model for the particular use case, wherein the particular quality of service class identifier is based on at least one of a type of guaranteed bit rate or non-guaranteed bit rate bearer, a maximum bit rate allowed in uplink or downlink, a priority level, or a packet loss rate for the dedicated bearer, wherein the information is sent from the user equipment one of in response to a radio resource control connection complete message or in addition to a radio resource control connection complete message from the user equipment, wherein there is sending towards the network node, an activated dedicated evolved packet system bearer context accept message; and communicating data on the dedicated bearer, and/or wherein the at least one of a machine learning or an artificial intelligence model is deployed as a new radio air interface mechanism or procedure.

A non-transitory computer-readable medium storing program code, the program code executed by at least one processor to perform at least the method as described in the paragraphs above.

In another example aspect of the invention, there is an apparatus comprising: means for sending, by a user equipment of a communication network, towards a network node information comprising a service request for a dedicated bearer for data exchange of at least one of machine learning or artificial intelligence related data, wherein the data exchange is for training at least one of a machine learning or an artificial intelligence model for a particular use case; and means, based on the information, for receiving from the network node an indication of a configured dedicated bearer, wherein the dedicated bearer is configured using predefined settings for a particular quality of service class identifier; and means, based on the indication, for performing at least one of uplink or downlink data communication on the dedicated bearer for the training.

In accordance with the example embodiments as described in the paragraph above, at least the means for sending, receiving, and performing comprises a network interface, and computer program code stored on a computer-readable medium and executed by at least one processor.

In an example aspect of example embodiments of the invention, there is an apparatus, such as a core network side apparatus, comprising: at least one processor; and at least one non-transitory memory storing instructions, that when executed by the at least one processor, cause the apparatus at least to: receive, by a device of a core network of a communication network, from a network node information comprising a service request from a user equipment for a dedicated bearer for data exchange of at least one of machine learning or artificial intelligence related data, wherein the data exchange is for training at least one of a machine learning or an artificial intelligence model for a particular use case; send towards the network node, a communication comprising an indication of a dedicated bearer for use by the user equipment for the for data exchange, wherein the dedicated bearer is sent based on acceptance of the user equipment by the core network, and wherein the dedicated bearer is configured using predefined settings for a particular quality of service class identifier.

In still another example aspect of example embodiments of the invention, there is a method comprising: receiving, by a device of a core network of a communication network, from a network node information comprising a service request from a user equipment for a dedicated bearer for data exchange of at least one of machine learning or artificial intelligence related data, wherein the data exchange is for training at least one of a machine learning or an artificial intelligence model for a particular use case; sending towards the network node, a communication comprising an indication of a dedicated bearer for use by the user equipment for the for data exchange, wherein the dedicated bearer is sent based on acceptance of the user equipment by the core network, and wherein the dedicated bearer is configured using predefined settings for a particular quality of service class identifier.

A further example embodiment is an apparatus and a method comprising the apparatus and the method of the previous paragraphs, wherein the at least one of machine learning or artificial intelligence related data is for at least one of full or partial model training, transfer of an offline trained model, model updates, or uplink or downlink model transfers for model life-cycle management of the at least one of a machine learning or an artificial intelligence model for the particular use case, wherein the model life-cycle management manages operations comprising at least one of activation, deactivation, switching, or updates for the at least one of a machine learning or an artificial intelligence model, wherein data life-cycle actions related to life cycle management are taken based on the machine learning related data or an artificial intelligence model for the particular use case, wherein the particular quality of service class identifier is based on at least one of a type of guaranteed bit rate or non-guaranteed bit rate bearer, a maximum bit rate allowed in uplink or downlink, a priority level, or a packet loss rate for the dedicated bearer, wherein communications with the network node are each using a non-access stratum message encapsulated in a radio resource control message, and/or wherein the at least one of a machine learning or an artificial intelligence model is deployed as a new radio air interface mechanism or procedure.

A non-transitory computer-readable medium storing program code, the program code executed by at least one processor to perform at least the method as described in the paragraphs above.

In yet another example aspect of example embodiments of the invention, there is an apparatus comprising: means for receiving, by a network node of a first network of a communication network from a first multi universal subscriber identity module of a first user equipment, based on a connection request from a second user equipment of a second network, network assistance information comprising an indication that the first user equipment needs to leave one carrier of the first network for a multi universal subscriber identity module operation; means in response to the assistance information, for sending to the user equipment of the first network, a gap configuration for a multi universal subscriber identity module operation; and means, based on the sending, for receiving the gap configuration for communicating towards the second user equipment for use by the second user equipment to establish a radio resource control connection with the second network.

In accordance with the example embodiments as described in the paragraph above, at least the means for receiving and sending comprises a network interface, and computer program code stored on a computer-readable medium and executed by at least one processor.

A communication system comprising the network side apparatus and the user equipment side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 3 shows quality of service identifiers and their mappings;

FIG. 5A, FIG. 5B, and FIG. 5C each show a method in accordance with example embodiments of the invention which may be performed by an apparatus.

DETAILED DESCRIPTION

Figure 1:
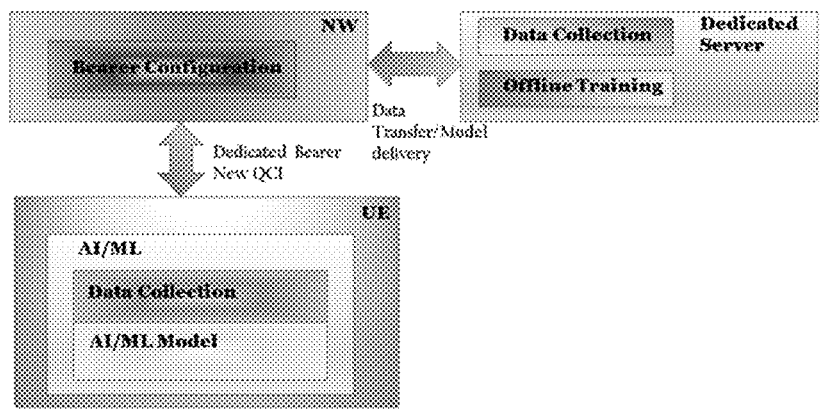
FIG. 1 shows an overview of data collection proposal using dedicated bearer for offline training of a UE side AI/ML model.

In example embodiments of this invention there is proposed at least a method and apparatus for a new machine learning-dedicated bearer for machine learning or artificial intelligence related data exchange related to model control and management.

As similarly stated above, with the emergence of Machine Learning (ML)-based use cases and features in wireless network, data collection for Artificial Intelligence (AI)/ML applications in wireless network is getting increasing interest not only from Network infrastructure vendors and mobile operators but from User Equipment (UE) chipset vendors as well.

Quality of Service (QOS) Class Identifier (CI) (QCI or 5QI (Quality Identifier) in 5G are the terms used interchangeably in this draft. QCI is a scalar used to define a reference for a specific packet forwarding behaviour (e.g. packet loss rate, packet delay budget) to be provided to a Service Data Flow (SDF). This mechanism may be implemented in the access network by the QCI referencing node specific parameters that control packet forwarding treatment (e.g. scheduling weights, admission thresholds, queue management thresholds, link layer protocol configuration, etc.), that have been pre-configured by the operator at a specific node(s) (e.g. eNodeB).

FIG. 3 shows quality of service identifiers and their mappings.

The following collaboration levels were defined during the AIML for Air Interface SI discussions in RAN1:
RAN1 #109 meeting:
Agreement
  Take the following network-UE collaboration levels as one aspect for defining collaboration levels
    1. Level x: No collaboration
    2. Level y: Signaling-based collaboration without model transfer
    3. Level z: Signaling-based collaboration with model transfer
  Note: Other aspect(s), for defining collaboration levels is not precluded and will be discussed in later meetings, e.g., with/without model updating, to support training/inference, for defining collaboration levels will be discussed in later meetings
  FFS: Clarification is needed for Level x-y boundary
RAN1 #110-bis meeting:
Working Assumption
  Define Level y-z boundary based on whether model delivery is transparent to 3gpp signalling over the air interface or not,
  Note: other procedures than model transfer/delivery are decoupled with collaboration level y-z;
  Clarifying note: Level y includes cases without model delivery.
Agreement
Clarify Level x/y boundary as:
  Level x is implementation-based AI/ML operation without any dedicated AI/ML-specific enhancement (e.g., LCM related signalling, RS) collaboration between network and UE,
  (Note: The AI/ML operation may rely on future specification not related to AI/ML collaboration. The AI/ML approaches can be used as baseline for performance evaluation for future releases.)
These collaboration levels define the way how network and UE need to cooperate in order to utilize the model. The absence of collaboration (i.e., Level X) does not mean that training, update, monitoring or data collection for the model is not needed. This just means that these procedures are transparent at the air interface of the 5G NR networks, and they can be done by some other means, e.g., on the application level.

In addition to collaboration levels, the "side" of the models is usually present in the discussions and use-cases, for example:
  One-sided model means that the model is implemented independently either on UE or network side,
  Two-sided model means that there is a certain level of dependence in between the models used at UE and networks side, that may require their joint training, monitoring, etc. One example of such model is autoencoder that require data encoding at one (e.g., UE) side so that later it can be decoded on the other (e.g., network) side.

A Summary of General Aspects of AI/ML Framework includes the following relevant agreements and working assumptions on general AI/ML aspects:

Agreement
  For model selection, activation, deactivation, switching, and fallback at least for UE sided models and two-sided models, study the following mechanisms:
    Decision by the network:
      Network-initiated,
      UE-initiated, requested to the network;
    Decision by the UE:
      Event-triggered as configured by the network, UE's decision is reported to network,
      UE-autonomous, UE's decision is reported to the network,
      UE-autonomous, UE's decision is not reported to the network;
  FFS: for network sided models;
  FFS: other mechanisms
Agreement
Study various approaches for achieving good performance across different scenarios/configurations/sites, including:
  Model generalization, i.e., using one model that is generalizable to different scenarios/configurations/sites;
  Model switching, i.e., switching among a group of models where each model is for a particular scenario/configuration/site:
    [Models in a group of models may have varying model structures, share a common model structure, or partially share a common sub-structure. Models in a group of models may have different input/output format and/or different pre-/post-processing.];
  Model update, i.e., using one model whose parameters are flexibly updated as the scenario/configuration/site that the device experiences changes over time. Fine-tuning is one example.
Agreement
For UE-part/UE-side models, study the following mechanisms for LCM procedures:
  For functionality-based LCM procedure: indication of activation/deactivation/switching/fallback based on individual AI/ML functionality
    Note: UE may have one AI/ML model for the functionality, or UE may have multiple AI/ML models for the functionality.
    FFS: Whether or how to indicate Functionality;
  For model-ID-based LCM procedure, indication of model selection/activation/deactivation/switching/fallback based on individual model IDs
Working Assumption
  Model parameter update Process of updating the model parameters of a model, and
  Model Update: Process of updating the model parameters and/or model structure of a model In the case of a UE side AI/ML models, some mechanism/framework would be required for information exchange between the UE and another centralized entity, e.g., for data collection, transfer of offline trained model, model updates, etc. Such centralized entity can belong either to the Communication Network Provider (CSP), or UE vendor, or telecom/network provider, etc. The framework will ensure data collection from the UE and the delivery of these data to the dedicated server in an undisclosed way. UE chipset vendors mostly prefer to use user plane for such data exchange (for example, application-level data exchange). Such approach may be a source of concern both for telecom operators and for data plan subscribers because the data is consumed form limited radio resource quota of the subscriber.

Telecom operators would like to have some level of control on such data transfer using their infrastructure while UE chipset vendors aren't motivated to use NR control-based mechanisms since it may disclose model-related information to Network infrastructure vendors as well as to telecom operators.

On the other hand, telecom operators are concerned about sending unknown data to an unknown server without having any control on such transfers, the amount of data to be sent, periodicity of transfers, etc.

Some key points of the problem can be summarized as follows:

UE chipset vendors prefer to use user plane and over-the-top communication for AI/ML model related data exchange, which is a source of concern for telecom operators;

Telecom Operators would like to have some control on such data transfer including amount of resources used for such transfers;

Telecom operators are also concerned about sending excessive amounts of, or uncontrolled, network-performance critical data to an external 3rd party server (even when bi-lateral agreements are in place).

The data collection has been discussed in the prior art and inventions found. There is discussed the framework about RAN initiated data collection and involves Network side entities such as network control entity. This mainly uses MDT (Minimization of Drive Test) framework for data collection.

To the best of our knowledge the idea of using a ML-dedicated radio bearer for data collection application for the data related to AI/ML models do not exist in the prior art. Furthermore, the idea to use a new standardized QCI for AI/ML application associated with the ML-dedicated bearer has not been discussed in prior art and this also involve some standardisation impacts and would subsequently need contribution to the standards.

In example embodiments of the invention it is proposed to handle the problem of control over AI/ML-related data exchange through a new ML-dedicated bearer. Such data exchange incudes:

i) Data collection: needed in particular for input to offline training of AI/ML models deployed in the NR air interface;

ii) Model transfer: AI/ML model related data exchange, including ML model itself (layers, architecture, etc.), ML model parameters (weights biases, functions etc.), ML model hyperparameters (training epoch, conditions context, etc.);

iii) Life cycle Management: ML model and/or ML functionality control signalling.

Figure 4:
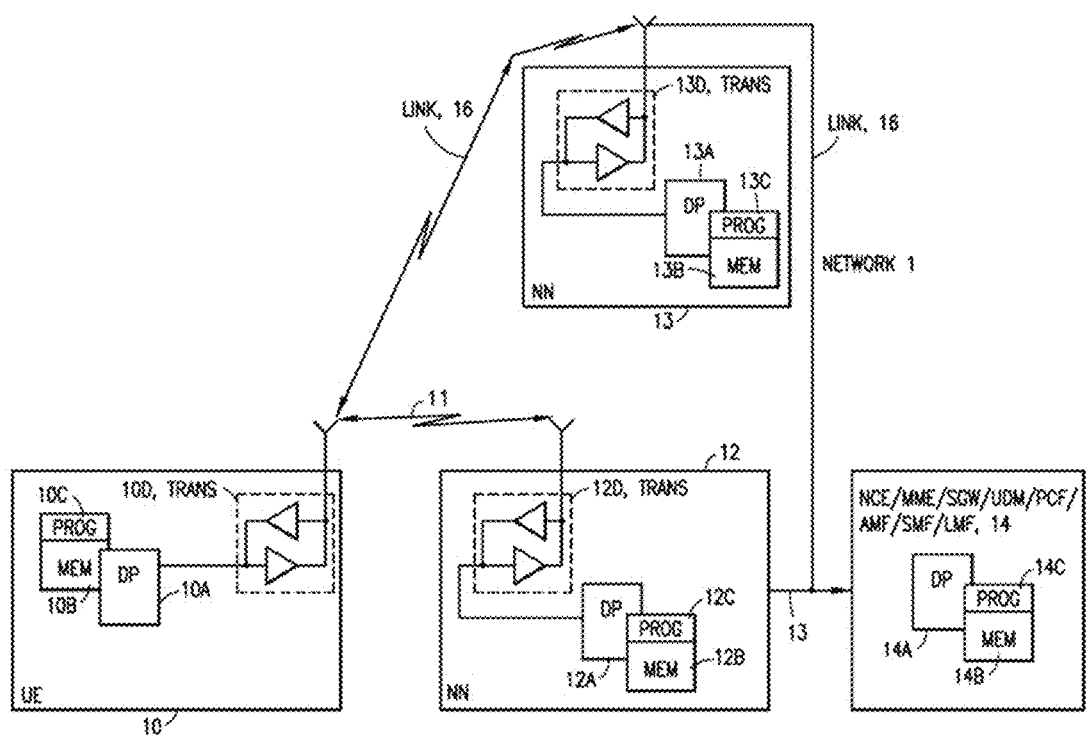
FIG. 4 shows a high level block diagram of various devices used in carrying out various aspects of the invention.

Before describing the example embodiments as disclosed herein in detail, reference is made to FIG. 4 for illustrating a simplified block diagram of various electronic devices that are suitable for use in practicing the example embodiments of this invention.

FIG. 4 shows a block diagram of one possible and non-limiting exemplary system in which the example embodiments may be practiced. In FIG. 4, a user equipment (UE) 10 is in wireless communication with a wireless network 1 or network, 1 as in FIG. 4. The wireless network 1 or network 1 as in FIG. 4 can comprise a communication network such as a mobile network e.g., the mobile network 1 or first mobile network as disclosed herein. Any reference herein to a wireless network 1 as in FIG. 4 can be seen as a reference to any wireless network as disclosed herein. Further, the wireless network 1 as in FIG. 4 can also comprises hardwired features as may be required by a communication network. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D which can be optionally connected to one or more antennas for communication to NN 12 and NN 13, respectively. The one or more memories MEM 10B include computer program code PROG 10C. The UE 10 communicates with NN 12 and/or NN 13 via a wireless link 11 or 16.

The NN 12 (NR/5G Node B, an evolved NB, or LTE device) is a network node such as a master or secondary node base station (e.g., for NR or LTE long term evolution) that communicates with devices such as NN 13 and UE 10 of FIG. 4. The NN 12 provides access to wireless devices such as the UE 10 to the wireless network 1. The NN 12 includes one or more processors DP 12A, one or more memories MEM 12B, and one or more transceivers TRANS 12D interconnected through one or more buses. In accordance with the example embodiments these TRANS 12D can include X2 and/or Xn interfaces for use to perform the example embodiments. Each of the one or more transceivers TRANS 12D includes a receiver and a transmitter. The one or more transceivers TRANS 12D can be optionally connected to one or more antennas for communication over at least link 11 with the UE 10. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13 such as via link 16. Further, the link 11, link 16 and/or any other link may be wired or wireless or both and may implement, e.g., an X2 or Xn interface. Further the link 11 and/or link 16 may be through other network devices such as, but not limited to an NCE/MME/SGW/UDM/PCF/AMF/SMF/LMF 14 device as in FIG. 4. The NN 12 may perform functionalities of an MME (Mobility Management Entity) or SGW (Serving Gateway), such as a User Plane Functionality, and/or an Access Management functionality for LTE and similar functionality for 5G.

The NN 13 can be associated with a mobility function device such as an AMF or SMF, further the NN 13 may comprise a NR/5G Node B or possibly an evolved NB a base station such as a master or secondary node base station (e.g., for NR or LTE long term evolution) that communicates with devices such as the NN 12 and/or UE 10 and/or the wireless network 1. The NN 13 includes one or more processors DP 13A, one or more memories MEM 13B, one or more network interfaces, and one or more transceivers TRANS 13D interconnected through one or more buses. In accordance with the example embodiments these network interfaces of NN 13 can include X2 and/or Xn interfaces for use to perform the example embodiments. Each of the one or more transceivers TRANS 13D includes a receiver and a transmitter that can optionally be connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the NN 12 and the UE 10 or any other device using, e.g., link 11 or link 16 or another link. The Link 16 as shown in FIG. 4 can be used for communication between the NN12 and the NN13. These links maybe wired or wireless or both and may implement, e.g., an X2 or Xn interface. Further, as stated above the link 11 and/or link 16 may be through other network devices such as, but not limited to an NCE/MME/SGW device such as the NCE/MME/SGW/UDM/PCF/AMF/SMF/LMF 14 of FIG. 4.

The one or more buses of the device of FIG. 4 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the NN 12 being physically in a different location from the RRH, and these devices can include one or more buses that could be implemented in part as fiber optic cable to connect the other elements of the NN 12 to a RRH.

It is noted that although FIG. 4 shows a network nodes such as NN 12 and NN 13, any of these nodes may can incorporate or be incorporated into an eNodeB or eNB or gNB such as for LTE and NR, and would still be configurable to perform example embodiments.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 or any network it can represent may or may not include a NCE/MME/SGW/UDM/PCF/AMF/SMF/LMF 14 that may include (NCE) network control element functionality, MME (Mobility Management Entity)/SGW (Serving Gateway) functionality, and/or serving gateway (SGW), and/or MME (Mobility Management Entity) and/or SGW (Serving Gateway) functionality, and/or user data management functionality (UDM), and/or PCF (Policy Control) functionality, and/or Access and Mobility Management Function (AMF) functionality, and/or Session Management (SMF) functionality, and/or Location Management Function (LMF), and/or Authentication Server (AUSF) functionality and which provides connectivity with a further network, such as a telephone network and/or a data communications network (e.g., the Internet), and which is configured to perform any 5G and/or NR operations in addition to or instead of other standard operations at the time of this application. The NCE/MME/SGW/UDM/PCF/AMF/SMF/LMF 14 is configurable to perform operations in accordance with example embodiments in any of an LTE, NR, 5G and/or any standards based communication technologies being performed or discussed at the time of this application. In addition, it is noted that the operations in accordance with example embodiments, as performed by the NN 12 and/or NN 13, may also be performed at the NCE/MME/SGW/UDM/PCF/AMF/SMF/LMF 14.

The NCE/MME/SGW/UDM/PCF/AMF/SMF/LMF 14 includes one or more processors DP 14A, one or more memories MEM 14B, and one or more network interfaces (N/W I/F(s)), interconnected through one or more buses coupled with the link 13 and/or link 16. In accordance with the example embodiments these network interfaces can include X2 and/or Xn interfaces for use to perform the example embodiments. The one or more memories MEM 14B include computer program code PROG 14C. The one or more memories MEM14B and the computer program code PROG 14C are configured to, with the one or more processors DP 14A, cause the NCE/MME/SGW/UDM/PCF/AMF/SMF/LMF 14 to perform one or more operations which may be needed to support the operations in accordance with the example embodiments.

It is noted that that the NN 12 and/or NN 13 and/or UE 10 can be configured (e.g. based on standards implementations etc.) to perform functionality of a Location Management Function (LMF). The LMF functionality may be embodied in any of these network devices or other devices associated with these devices. In addition, an LMF such as the LMF of the MME/SGW/UDM/PCF/AMF/SMF/LMF 14 of FIG. 4, as at least described below, can be co-located with UE 10 such as to be separate from the NN 12 and/or NN 13 of FIG. 4 for performing operations in accordance with example embodiments as disclosed herein.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, and DP14A may be means for performing functions, such as controlling the UE 10, NN 12, NN 13, and other functions as described herein.

In general, various embodiments of any of these devices can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Further, the various embodiments of any of these devices can be used with a UE vehicle, a High Altitude Platform Station, or any other such type node associated with a terrestrial network or any drone type radio or a radio in aircraft or other airborne vehicle or a vessel that travels on water such as a boat.

As similarly stated above, In example embodiments of the invention it is proposed to handle the problem of control over AI/ML-related data exchange through a new ML-dedicated bearer. Such data exchange incudes:

Data collection: needed in particular for input to offline training of AI/ML models deployed as a new radio air interface mechanism or procedure;

Model transfer: AI/ML model related data exchange, including ML model itself (layers, architecture, etc.), ML model parameters (weights biases, functions etc.), ML model hyperparameters (training epoch, conditions context, etc.); and Life cycle Management: ML model and/or ML functionality control signalling.

The approach will allow operators to control and/or reserve resources for such usage of (radio/channel) resources on user plane and at the same time will provide means to collect data transparently from the UE to the dedicated 3rd party server, e.g. for offline training, and to bring back trained model(s) from the server to the UE.

Example embodiments of invention propose a method/procedure for the configuration of a new dedicated bearer for information exchange in relation to the ML model lifecycle management (LCM). Example embodiments of invention are demonstrated on the case of data collection for offline training in a UE side AI/ML model.

In fact, this would enable operator's control on such data transfer while keeping the transfer itself secure and undisclosed to any third party. The benefits of using a dedicated bearer are:

The mechanism provides a dedicated tunnel to one or more specific traffic and in considered case the dedicated traffic would be data for offline training and other AI/ML related data exchanges, Maximum bit rate for both uplink and downlink can be configured in order to control/limit consumption of resources in the network, Dedicated bearer can be both non-Guaranteed Bit Rate (non-GBR) or GBR bearer, which can be used to map more flexibly the resources for such transfer, Dedicated bearer uses Traffic Flow Templates (TFT) to give special treatment to this specific service, Some services, such as data collection, may require a high level of QoS, so network can create a dedicated bearer with required QoS, Dedicated bearer can be created/release on demand, and A new standardized QoS Class Identifier (5QI/QCI) will be added for data collection application Depending on the targeted application, it is necessary that the dedicated bearer is appropriately configured with the suitable characteristic (such as GBR or Best effort). Additionally, limitations on maximum bit rates need to be introduced. Therefore, in example embodiments of this invention, we propose to add a new QCI for data collection application.

The logical diagram of the operations as performed in accordance with example embodiments of invention is shown in FIG. 1. Network configures the dedicated bearer with the required QoS in order to establish the data collection tunnel for off-line training of AI/ML Model present at the UE side. This tunnel transports UE measured data towards the dedicated server in an undisclosed way where offline training takes places for the targeted model. Once the model is trained the trained model can be transported back towards the UE using the same tunnel or any other framework, that framework is not in the scope of this invention.

Standard QCIs are QCIs whose QoS requirements have been determined by the 3GPP protocol, their values include 1~9, 65~67, 69~76, 79, 80, 82~85. In example embodiments of this invention, we propose to add new standard QCI(s) for data collection application for offline training in case of UE side AI/ML model.

In the following, we provide an exemplary implementation of the proposed example embodiments of the invention. When the UE decides to send data (for instance, UE side measurements) towards a dedicated server, where the offline training for a UE side AI/ML model would take place, it requests the network to configure a dedicated bearer. This would be done using NAS (Non-access stratum) messages (to the core network) encapsulated in RRC (Radio Resource Control) messages. Network then configures a dedicated bearer for data collection using the predefined settings for QoS for this dedicated bearer. This would include, type of bearer (GBR or non-GBR), maximum bit rate allowed in UL and DL as well priority level and Packet Delay Budget (PDB) and pack error loss rate for the bearer to be configured.

This new dedicated bearer, known as MLBR, and should be standardized.

Figure 2:
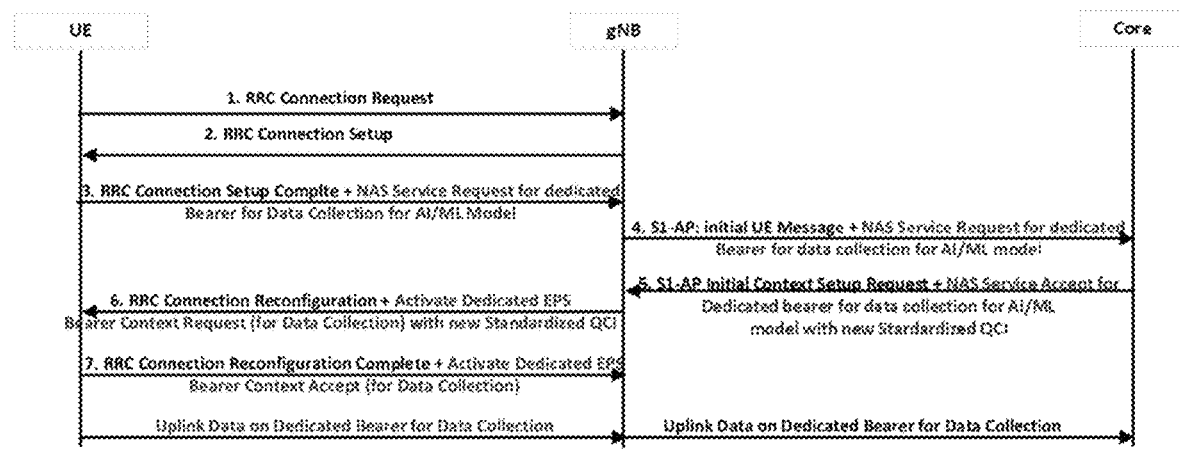
FIG. 2 shows a call flow for configuration of dedicated bearer for data collection for offline training of a UE side AI/ML model.

FIG. 2 shows the call flow for the configuration of dedicated bearer for data collection. It shows exchanges of messages between UE, gNB and the core network. The text underlined below shows the new contents for these messaging.

Step 1-2: In these steps, connection setup between UE and gNB is established.

Step 3: After the RRC connection setup is completed and acknowledged, UE will also send NAS service request for MLBR in order to data collection needed for training an ML model for the selected use case.

Step 4: gNB will forward the initial UE message along with the MLBR request to the Core NW.

Step 5: Core NW will process this information and accept the UE for the particular QCI. Since this is a standardized QCI, Network knows the purpose of this data transfer and have information about the maximum bit rate allowed, packet delay budget, priority and packet error loss rate for this transfer.

Step 6: gNB will send the RRC reconfiguration and a dedicated EPS with new Standardized QCI to the UE.

Step 7-8: After acknowledging the RRC reconfiguration complete, UE starts the data collection for the particular use case. Transmitted data can include information needed for the model performance monitoring or potential updates/retrainings. Example of such information includes, model performance, model inputs and/or inference outcomes, UE measurements, system performance, mobility events, timestamps, etc.

The call flow in FIG. 2 demonstrates one example of bearer configuration for the data collection from the UE. However, the approach can be extended in several directions:

1) The bearer can be configured not only for Uplink (UL) direction when the information is transferred from the UE but also in the DL direction, when the model updates can be transmitted from the vendor-specific server back to the UE;
2) Instead of only one bearer, a set of bearers or a bearer with a flexible configuration can be introduced. Then, the network gets more control over the data flows (traffic load) and overhead introduced by the AI/ML-related model information exchange:
   a. For example, if radio channel conditions are getting more volatile for the UE or the UE reports impacts adversely the performance of AI/ML-based model/functionality, then the network can dedicate more resources for the model data collection, e.g., by configuring a bearer with high priority or resource type. This will ensure faster data transfer and a prompt update of the model;
3) In another embodiment, the MLBR can be dynamically activated/deactivated by the network depending on the traffic load and/or UE conditions and/or ML-based mode/function performance, etc.;
4) The bearer(s) can be configured not only for the UE-side models, but also for network-side models and for two-sided models:
   a. In a way similar to UE-sided models, the telecom operator gets better view and control over the resources consumed by the model-related data exchange;
5) In the case of offline model training there is a clearer split in between the data collection and model transfer stages. However, the MLBR also provides the means to control the data exchange for more dynamic online training when data collection and mode updates are continuous.

Figure 5A:
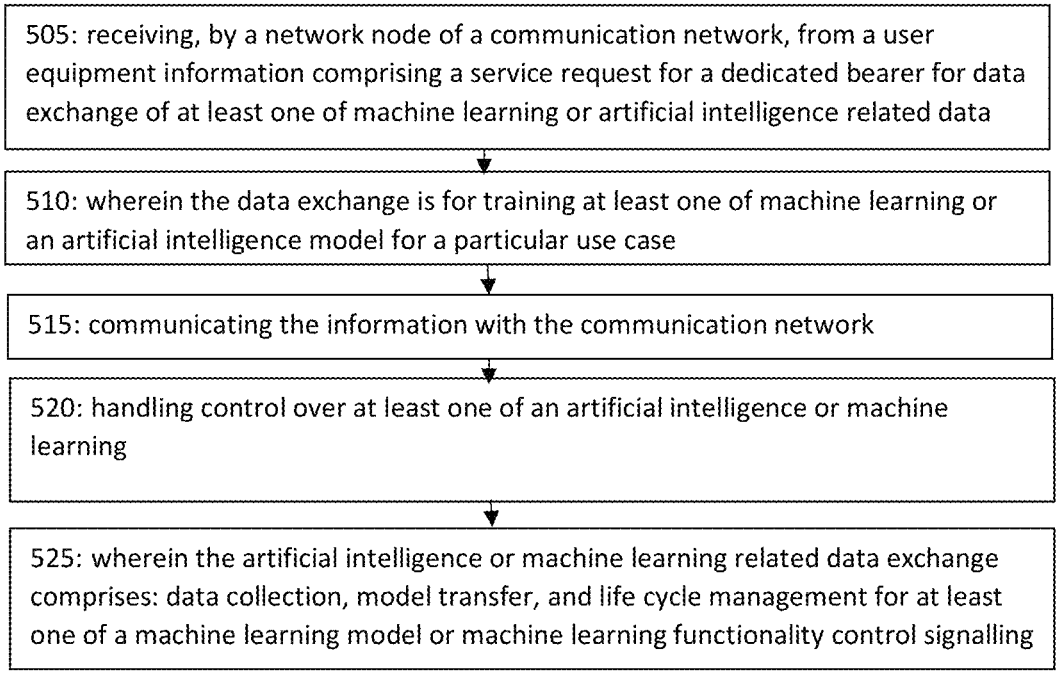

FIG. 5A, FIG. 5B, and FIG. 5C each show a method that may be performed in accordance with example embodiments of the invention.

FIG. 5A illustrates operations which may be performed by a device such as, but not limited to, a network node device (e.g., the NN 12 and/or NN 13 as in FIG. 4). As shown in step 505 of FIG. 5A there is receiving, by a network node of a communication network, from a user equipment information comprising a service request for a dedicated bearer for data exchange of at least one of machine learning or artificial intelligence related data; as shown in step 510 of FIG. 5 wherein the data exchange is for training at least one of a machine learning or an artificial intelligence model for a particular use case; as shown in step 515 of FIG. 5A there is communicating the information with the communication network; as shown in step 520 of FIG. 5A there is handling control over at least one of an artificial intelligence or machine learning related data exchange through a machine learning-dedicated bearer; then as shown in step 525 of FIG. 5A wherein the artificial intelligence or machine learning related data exchange comprises: data collection, model transfer, and life cycle management for at least one of a machine learning model or machine learning functionality control signalling.

In accordance with the example embodiments as described in the paragraph above, wherein the data collection is used in particular for input to offline training of artificial intelligence or machine learning models deployed as a new radio air interface mechanism or procedure.

In accordance with the example embodiments as described in the paragraph above, wherein artificial intelligence or machine learning related data exchange, comprises a machine learning model comprising layers, architecture, and machine learning model parameters.

In accordance with the example embodiments as described in the paragraph above, wherein the machine learning model parameters comprise at least one of weights biases, functions, or machine learning model hyperparameters comprising a training epoch and conditions context.

In accordance with the example embodiments as described in the paragraph above, wherein the at least one of machine learning or artificial intelligence related data is for at least one of full or partial model training, transfer of an offline trained model, model updates, or uplink or downlink model transfers for model life-cycle management of the at least one of a machine learning or an artificial intelligence model for the particular use case.

In accordance with the example embodiments as described in the paragraphs above, wherein the model life-cycle management manages operations comprising at least one of activation, deactivation, switching, or updates for the at least one of a machine learning or an artificial intelligence model.

In accordance with the example embodiments as described in the paragraphs above, wherein data life-cycle actions related to life cycle management are taken based on the machine learning related data or an artificial intelligence model for the particular use case.

In accordance with the example embodiments as described in the paragraphs above, wherein the particular quality of service class identifier is based on at least one of a type of guaranteed bit rate or non-guaranteed bit rate bearer, a maximum bit rate allowed in uplink or downlink, a priority level, a packet delay budget, a default maximum data burst volume, a default averaging window, or a packet error rate for the dedicated bearer.

In accordance with the example embodiments as described in the paragraphs above, wherein communications with the communication network are each using a non-access stratum message encapsulated in a radio resource control message.

In accordance with the example embodiments as described in the paragraphs above, wherein the information is received from the user equipment one of in response to a radio resource control connection complete message or in addition to a radio resource control connection complete message from the user equipment.

In accordance with the example embodiments as described in the paragraphs above, wherein there is receiving from the user equipment, by the network node, an activated dedicated evolved packet system bearer context accept message; and communicate with the user equipment at least one of uplink or downlink data on the dedicated bearer.

In accordance with the example embodiments as described in the paragraphs above, wherein the communicating is performed with a core network of the communication network.

In accordance with the example embodiments as described in the paragraphs above, wherein the at least one of a machine learning or an artificial intelligence model is deployed as a new radio air interface mechanism or procedure.

In accordance with the example embodiments as described in the paragraphs above, wherein the request comprises an activate dedicated evolved packet system bearer context accept message.

A non-transitory computer-readable medium (MEM 12B and/or MEM 13B as in FIG. 4) storing program code (PROG 12C and/or PROG 13C as in FIG. 4), the program code executed by at least one processor (DP 12A and/or DP 13A as in FIG. 4) to perform the operations as at least described in the paragraphs above.

In accordance with an example embodiment of the invention as described above there is an apparatus comprising: means for receiving (one or more transceivers 12D and/or 13D; MEM 12B and/or MEM 13B; PROG 12C and/or PROG 13C; and DP 12A and/or DP 13A as in FIG. 4), by a network node (NN 12 and/or NN 14 as in FIG. 4) of a communication network (Network 1 as in FIG. 4), from a user equipment (UE 10 as in FIG. 4) information comprising a service request for a dedicated bearer for data exchange of at least one of machine learning or artificial intelligence related data, wherein the data exchange is for training (one or more transceivers 12D and/or 13D; MEM 12B and/or MEM 13B; PROG 12C and/or PROG 13C; and DP 12A and/or DP 13A as in FIG. 4) at least one of a machine learning or an artificial intelligence model for a particular use case; means for communicating (one or more transceivers 12D and/or 13D; MEM 12B and/or MEM 13B; PROG 12C and/or PROG 13C; and DP 12A and/or DP 13A as in FIG. 4) the information with the communication network; means for handling (one or more transceivers 12D and/or 13D; MEM 12B and/or MEM 13B; PROG 12C and/or PROG 13C; and DP 12A and/or DP 13A as in FIG. 4) control over at least one of an artificial intelligence or machine learning related data exchange through a machine learning-dedicated bearer, wherein the artificial intelligence or machine learning related data exchange comprises: means for data collection (one or more transceivers 12D and/or 13D; MEM 12B and/or MEM 13B; PROG 12C and/or PROG 13C; and DP 12A and/or DP 13A as in FIG. 4), means for model transfer (one or more transceivers 12D and/or 13D; MEM 12B and/or MEM 13B; PROG 12C and/or PROG 13C; and DP 12A and/or DP 13A as in FIG. 4), and means for life cycle Management (one or more transceivers 12D and/or 13D; MEM 12B and/or MEM 13B; PROG 12C and/or PROG 13C; and DP 12A and/or DP 13A as in FIG. 4) for at least one of a machine learning model or machine learning functionality control signalling.

In the example aspect of the invention according to the paragraph above, wherein at least the means for receiving, training, communicating, configuring, handling, data collection, model transfer, and life cycle Management comprises a non-transitory computer readable medium [MEM 12B and/or MEM 13B as in FIG. 4] encoded with a computer program [PROG 12C and/or PROG 13C as in FIG. 4] executable by at least one processor [DP 12A and/or DP 13A as in FIG. 4].

FIG. 5B illustrates operations which may be performed by a device such as, but not limited to, a network device (e.g., the UE 10 as in FIG. 4). As shown in step 530 of FIG. 5B there is sending by a user equipment of a communication network, towards a network node information comprising a service request for a dedicated bearer for data exchange of at least one of machine learning or artificial intelligence related data; as shown in step 535 of FIG. 5B wherein the data exchange is for training at least one of a machine learning or an artificial intelligence model for a particular use case; as shown in step 540 of FIG. 5B there is, based on the information, receiving from the network node an indication of a configured dedicated bearer; as shown in step 545 of FIG. 5B wherein the dedicated bearer is configured using predefined settings for a particular quality of service class identifier; then as shown in step 550 of FIG. 5B there is, based on the indication, performing at least one of uplink or downlink data communication on the dedicated bearer for the training.

In accordance with the example embodiments as described in the paragraph above, wherein the at least one of machine learning or artificial intelligence related data is for at least one of full or partial model training, transfer of an offline trained model, model updates, or uplink or downlink model transfers for model life-cycle management of the at least one of a machine learning or an artificial intelligence model for the particular use case.

In accordance with the example embodiments as described in the paragraphs above, wherein the model life-cycle management manages operations comprising at least one of activation, deactivation, switching, or updates for the at least one of a machine learning or an artificial intelligence model.

In accordance with the example embodiments as described in the paragraphs above, wherein data life-cycle actions related to life cycle management are taken based on the machine learning related data or an artificial intelligence model for the particular use case.

In accordance with the example embodiments as described in the paragraphs above, wherein the particular quality of service class identifier is based on at least one of a type of guaranteed bit rate or non-guaranteed bit rate bearer, a maximum bit rate allowed in uplink or downlink, a priority level, a packet delay budget, a default maximum data burst volume, a default averaging window, or a packet error rate for the dedicated bearer.

In accordance with the example embodiments as described in the paragraphs above, wherein the information is sent from the user equipment one of in response to a radio resource control connection complete message or in addition to a radio resource control connection complete message from the user equipment.

In accordance with the example embodiments as described in the paragraphs above, wherein there is sending towards the network node, an activated dedicated evolved packet system bearer context accept message; and communicating data on the dedicated bearer.

In accordance with the example embodiments as described in the paragraphs above, wherein the at least one of a machine learning or an artificial intelligence model is deployed as a new radio air interface mechanism or procedure.

A non-transitory computer-readable medium (MEM 10B as in FIG. 4) storing program code (PROG 10C as in FIG. 4), the program code executed by at least one processor (DP 10A as in FIG. 4) to perform the operations as at least described in the paragraphs above.

In accordance with an example embodiment of the invention as described above there is an apparatus comprising: means for sending (one or more transceivers 10D; MEM 10B; PROG 10C; and DP 10A as in FIG. 4) by a user equipment (UE 10 as in FIG. 4) of a communication network (Network 1 as in FIG. 4), towards a network node (NN 12 and/or NN 13 as in FIG. 12) information comprising a service request for a dedicated bearer for data exchange of at least one of machine learning or artificial intelligence related data, wherein the data exchange is for training (one or more transceivers 10D; MEM 10B; PROG 10C; and DP 10A as in FIG. 4) at least one of a machine learning or an artificial intelligence model for a particular use case; means, based on the information, for receiving (one or more transceivers 10D; MEM 10B; PROG 10C; and DP 10A as in FIG. 4) from the network node an indication of a configured dedicated bearer, wherein the dedicated bearer is configured (one or more transceivers 10D; MEM 10B; PROG 10C; and DP 10A as in FIG. 4) using predefined settings for a particular quality of service class identifier; then means, based on the indication, performing (one or more transceivers 10D; MEM 10B; PROG 10C; and DP 10A as in FIG. 4) uplink data communication on the dedicated bearer for the training.

In the example aspect of the invention according to the paragraph above, wherein at least the means for sending, training, receiving, and performing comprises a non-transitory computer readable medium [MEM 10B as in FIG. 4] encoded with a computer program [PROG 10C as in FIG. 4] executable by at least one processor [DP 10A as in FIG. 4].

FIG. 5C illustrates operations which may be performed by a device such as, but not limited to, a core network node device (e.g., the NN 12 and/or NN 13 as in FIG. 4). As shown in step 555 of FIG. 5C there is receiving, by a device of a core network of a communication network, from a network node information comprising a service request from a user equipment for a dedicated bearer for data exchange of at least one of machine learning or artificial intelligence related data, wherein the data exchange is for training at least one of a machine learning or an artificial intelligence model for a particular use case; as shown in step 560 of FIG. 5C there is sending towards the network node, a communication comprising an indication of a dedicated bearer for use by the user equipment for the data exchange; as shown in step 565 of FIG. 5C wherein the dedicated bearer is sent based on acceptance of the user equipment by the core network; then as shown in step 570 of FIG. 5C wherein the dedicated bearer is configured using predefined settings for a particular quality of service class identifier.

In accordance with the example embodiments as described in the paragraph above, wherein the at least one of machine learning or artificial intelligence related data is for at least one of full or partial model training, transfer of an offline trained model, model updates, or uplink or downlink model transfers for model life-cycle management of the at least one of a machine learning or an artificial intelligence model for the particular use case.

In accordance with the example embodiments as described in the paragraphs above, wherein the model life-cycle management manages operations comprising at least one of activation, deactivation, switching, or updates for the at least one of a machine learning or an artificial intelligence model.

In accordance with the example embodiments as described in the paragraphs above, wherein data life-cycle actions related to life cycle management are taken based on the machine learning related data or an artificial intelligence model for the particular use case.

In accordance with the example embodiments as described in the paragraphs above, wherein the particular quality of service class identifier is based on at least one of a type of guaranteed bit rate or non-guaranteed bit rate bearer, a maximum bit rate allowed in uplink or downlink, a priority level, or a packet error rate for the dedicated bearer.

In accordance with the example embodiments as described in the paragraphs above, wherein communications with the network node are each using a non-access stratum message encapsulated in a radio resource control message.

In accordance with the example embodiments as described in the paragraphs above, wherein the at least one of a machine learning or an artificial intelligence model is deployed as a new radio air interface mechanism or procedure.

A non-transitory computer-readable medium (MEM 12B and/or MEM 13B as in FIG. 4) storing program code (PROG 12C and/or PROG 13C as in FIG. 4), the program code executed by at least one processor (DP 12A and/or DP 13A as in FIG. 4) to perform the operations as at least described in the paragraphs above.

In accordance with an example embodiment of the invention as described above there is an apparatus comprising: means for receiving (one or more transceivers 12D and/or 13D; MEM 12B and/or MEM 13B; PROG 12C and/or PROG 13C; and DP 12A and/or DP 13A as in FIG. 4), by a device (NN 12 and/or NN 13 as in FIG. 4) of a core network of a communication network (Network 1 as in FIG. 4), from a network node (NN 12 and/or NN 13 as in FIG. 4) information comprising a service request from a user equipment (UE 10 as in FIG. 4) for a dedicated bearer for data exchange of at least one of machine learning or artificial intelligence related data, wherein the data exchange is for training (one or more transceivers 12D and/or 13D; MEM 12B and/or MEM 13B; PROG 12C and/or PROG 13C; and DP 12A and/or DP 13A as in FIG. 4) at least one of a machine learning or an artificial intelligence model for a particular use case; means for sending (one or more transceivers 12D and/or 13D; MEM 12B and/or MEM 13B; PROG 12C and/or PROG 13C; and DP 12A and/or DP 13A as in FIG. 4) towards the network node, a communication comprising an indication of a dedicated bearer for use by the user equipment for the data exchange, wherein the dedicated bearer is sent based on acceptance of the user equipment by the core network, and wherein the dedicated bearer is configured (one or more transceivers 12D and/or 13D; MEM 12B and/or MEM 13B; PROG 12C and/or PROG 13C; and DP 12A and/or DP 13A as in FIG. 4) using predefined settings for a particular quality of service class identifier.

In the example aspect of the invention according to the paragraph above, wherein at least the means for receiving, training, sending, and configuring comprises a non-transitory computer readable medium [MEM 12B and/or MEM 13B as in FIG. 4] encoded with a computer program [PROG 12C and/or PROG 13C as in FIG. 4] executable by at least one processor [DP 12A and/or DP 13A as in FIG. 4].

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:

(a) hardware-only circuit implementations (such as implementations in only analog and/or digital circuitry);
(b) combinations of hardware circuits and software, such as (as applicable):
(i) a combination of analog and/or digital hardware circuit(s) with software/firmware; and
(ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
(c) hardware circuit(s) and or processor(s), such as a microprocessor(s) or a portion of a microprocessor(s), that requires software (e.g., firmware) for operation, but the software may not be present when it is not needed for operation."

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of example embodiments of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
   at least one processor; and
   at least one non-transitory memory storing instructions, that when executed by the at least one processor, cause the apparatus at least to:
   send, by a user equipment of a communication network, towards a network node information comprising a service request for a dedicated bearer for data exchange of at least one of machine learning or artificial intelligence related data,
   wherein the data exchange is for training the at least one of a machine learning or an artificial intelligence model for a particular use case; and
   based on the information, receive from the network node an indication of a configured dedicated bearer,
   wherein the dedicated bearer is configured using predefined settings for a particular quality of service class identifier; and
   based on the indication, perform at least one of uplink or downlink data communication on the dedicated bearer for the training,
   wherein the at least one of a machine learning or artificial intelligence related data is for the following: full or partial model training, transfer of an offline trained model, model updates, uplink or downlink model transfers for model life-cycle management of the at least one of a machine learning or an artificial intelligence model for the particular use case,
   wherein the model life-cycle management manages operations comprising the following: activation, deactivation, switching, and updates for the at least one of a machine learning or an artificial intelligence model,
   wherein the particular quality of service class identifier is based on the following: a type of guaranteed bit rate or non-guaranteed bit rate bearer, a maximum bit rate allowed in uplink or downlink, a priority level, a packet delay budget, a default maximum data burst volume, a default averaging window, and a packet loss rate for the dedicated bearer.

2. The apparatus of claim 1, wherein actions related to life cycle management are taken based on the machine learning related data or information or an artificial intelligence model for the particular use case.

3. The apparatus of claim 1, wherein the information is sent from the user equipment one of in response to a radio resource control connection complete message or in addition to a radio resource control connection complete message from the user equipment.

4. The apparatus of claim 1, wherein the at least one non-transitory memory is storing instructions executed by the at least one processor, cause the apparatus at least to:
send towards the network node, an activated dedicated evolved packet system bearer context accept message; and
communicate data on the dedicated bearer.

5. A method, comprising:
sending, by a user equipment of a communication network, towards a network node information comprising a service request for a dedicated bearer for data exchange of at least one of machine learning or artificial intelligence related data,
wherein the data exchange is for training the at least one of a machine learning or an artificial intelligence model for a particular use case; and
based on the information, receiving from the network node an indication of a configured dedicated bearer,
wherein the dedicated bearer is configured using pre-defined settings for a particular quality of service class identifier; and
based on the indication, performing at least one of uplink or downlink data communication on the dedicated bearer for the training,
wherein the at least one of a machine learning or artificial intelligence related data is for the following: full or partial model training, transfer of an offline trained model, model updates, and uplink or downlink model transfers for model life-cycle management of the at least one of a machine learning or an artificial intelligence model for the particular use case,
wherein the model life-cycle management manages operations comprising the following: activation, deactivation, switching, and updates for the at least one of a machine learning or an artificial intelligence model,
wherein the particular quality of service class identifier is based on the following: a type of guaranteed bit rate or non-guaranteed bit rate bearer, a maximum bit rate allowed in uplink or downlink, a priority level, a packet delay budget, a default maximum data burst volume, a default averaging window, and a packet loss rate for the dedicated bearer.

6. The method of claim 5, wherein actions related to life cycle management are taken based on the machine learning related data or information or an artificial intelligence model for the particular use case.

7. The method of claim 5, wherein the information is sent from the user equipment one of in response to a radio resource control connection complete message or in addition to a radio resource control connection complete message from the user equipment.

8. The method of claim 5, wherein the at least one non-transitory memory is storing instructions executed by the at least one processor, cause the apparatus at least to:
send towards the network node, an activated dedicated evolved packet system bearer context accept message; and
communicate data on the dedicated bearer.

9. A non-transitory computer-readable medium storing program code, the program code executed by at least one processor to cause an apparatus to perform:
sending towards a network node information comprising a service request for a dedicated bearer for data exchange of at least one of machine learning or artificial intelligence related data,
wherein the data exchange is for training the at least one of a machine learning or an artificial intelligence model for a particular use case; and
based on the information, receiving from the network node an indication of a configured dedicated bearer,
wherein the dedicated bearer is configured using pre-defined settings for a particular quality of service class identifier; and
based on the indication, performing at least one of uplink or downlink data communication on the dedicated bearer for the training,
wherein the at least one of a machine learning or artificial intelligence related data is for the following: full or partial model training, transfer of an offline trained model, model updates, and uplink or downlink model transfers for model life-cycle management of the at least one of a machine learning or an artificial intelligence model for the particular use case,
wherein the model life-cycle management manages operations comprising the following: activation, deactivation, switching, and updates for the at least one of a machine learning or an artificial intelligence model,
wherein the particular quality of service class identifier is based on the following: a type of guaranteed bit rate or non-guaranteed bit rate bearer, a maximum bit rate allowed in uplink or downlink, a priority level, a packet delay budget, a default maximum data burst volume, a default averaging window, and a packet loss rate for the dedicated bearer.

10. The non-transitory computer-readable medium of claim 9, wherein actions related to life cycle management are taken based on the machine learning related data or information or an artificial intelligence model for the particular use case.

11. The non-transitory computer-readable medium of claim 10, wherein the information is sent from the apparatus one of in response to a radio resource control connection complete message or in addition to a radio resource control connection complete message from the apparatus.

* * * * *